Figure 1:
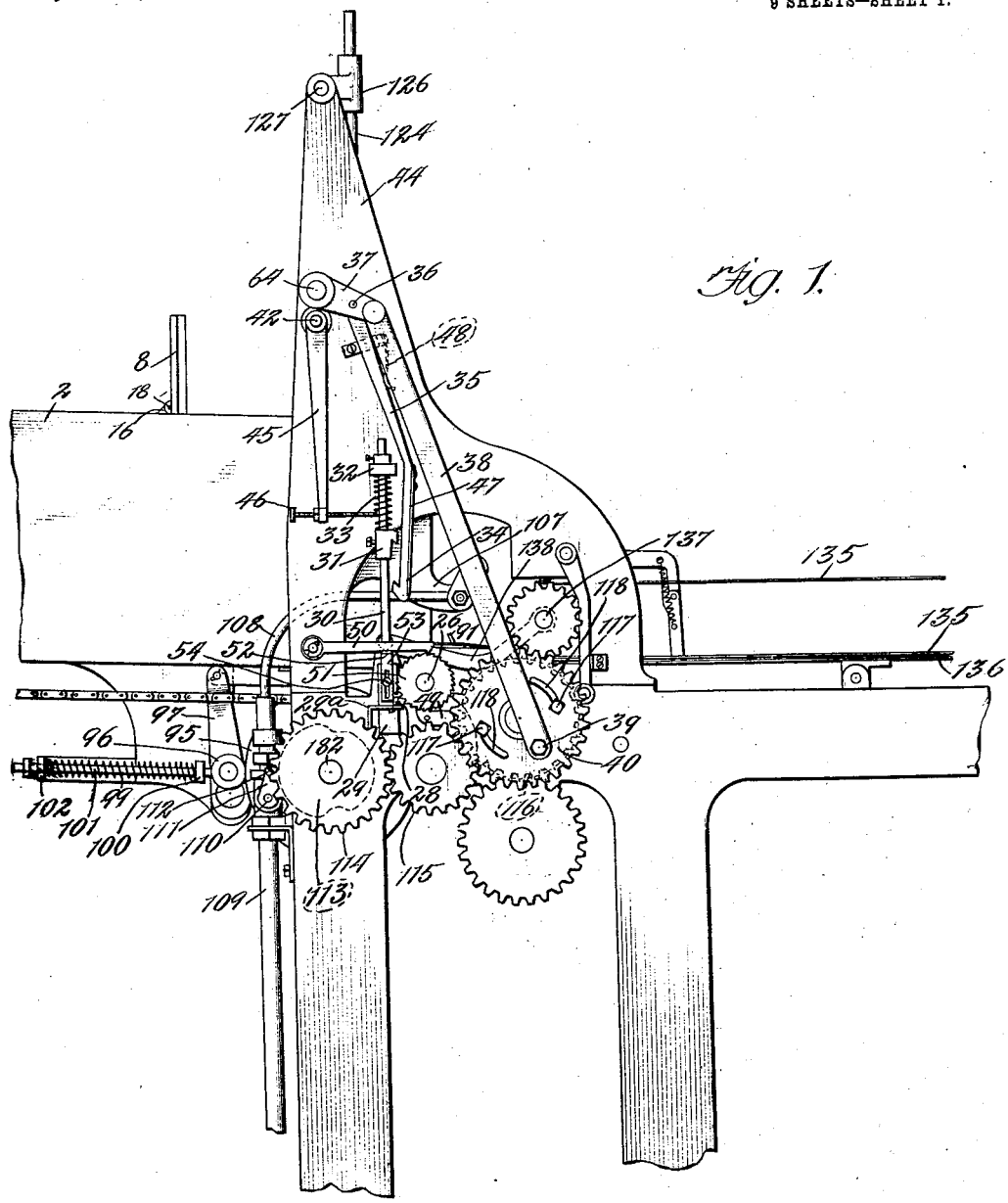

S. C. COX.
FEEDER FOR ADDRESSING MACHINES, &c.
APPLICATION FILED JUNE 25, 1907.

1,087,643.

Patented Feb. 17, 1914.
9 SHEETS—SHEET 1.

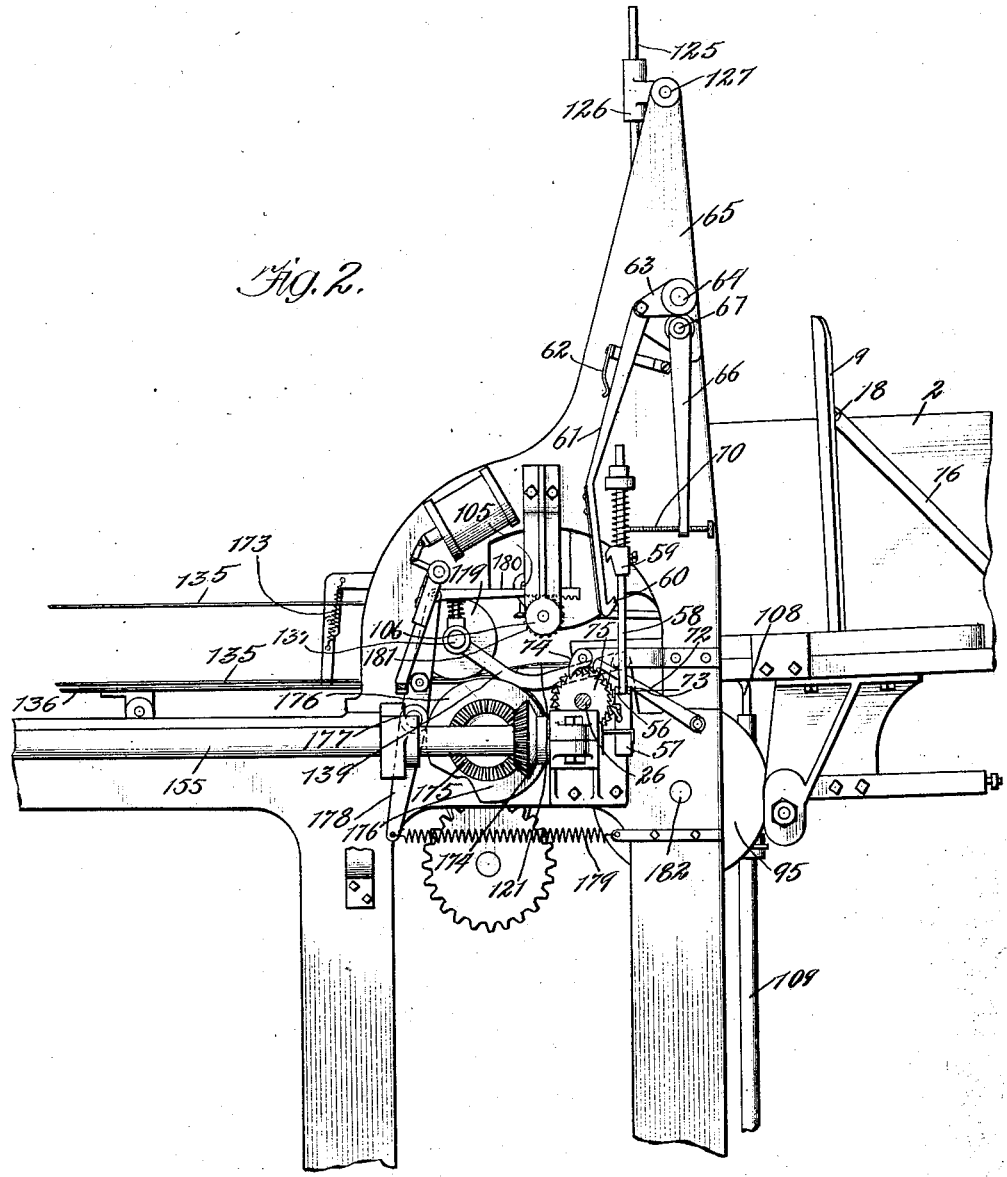

S. C. COX.
FEEDER FOR ADDRESSING MACHINES, &c.
APPLICATION FILED JUNE 25, 1907.
1,087,643.
Patented Feb. 17, 1914.
9 SHEETS—SHEET 3.
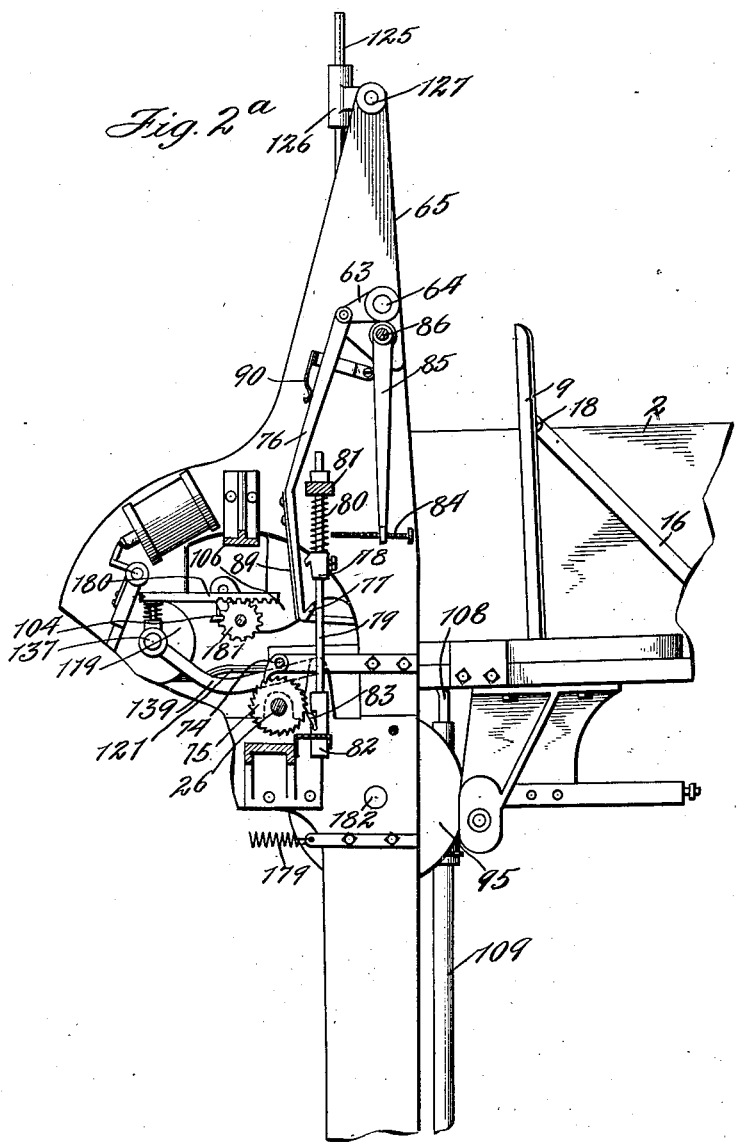

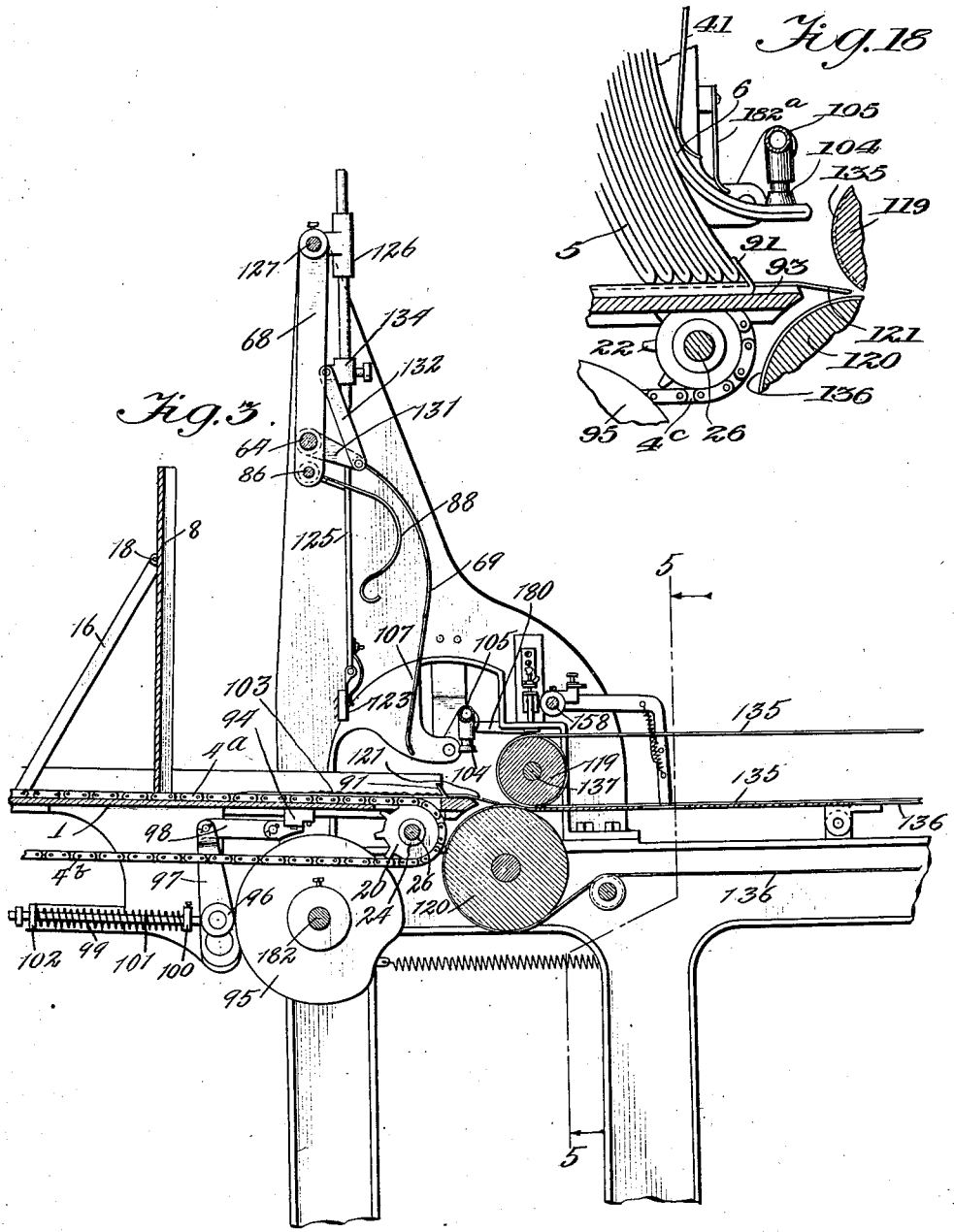

S. C. COX.
FEEDER FOR ADDRESSING MACHINES, &c.
APPLICATION FILED JUNE 25, 1907.

1,087,643.

Patented Feb. 17, 1914.
9 SHEETS—SHEET 5.

Witnesses:

Inventor:
S. C. Cox
by Brown & Hopkins
attys

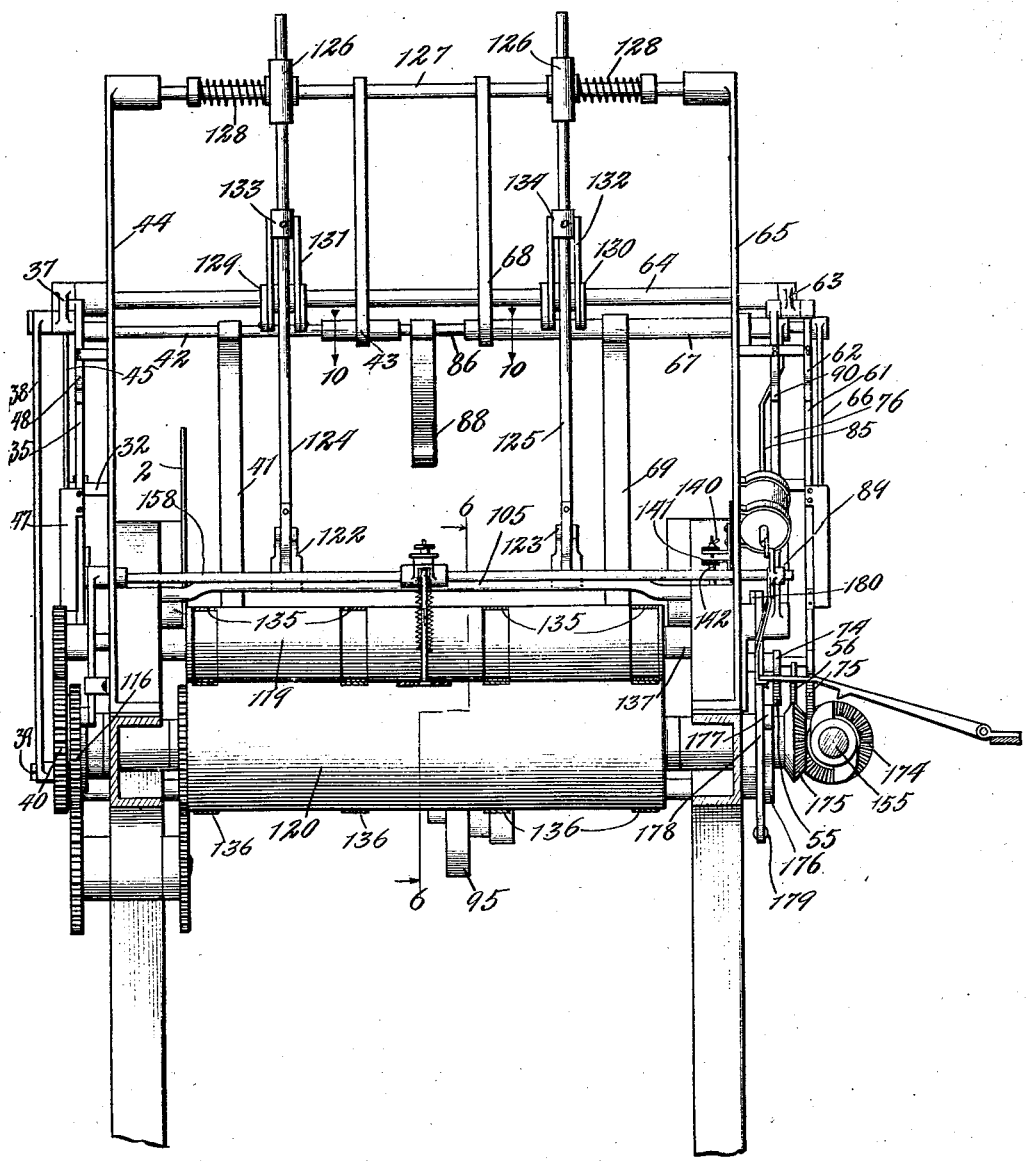

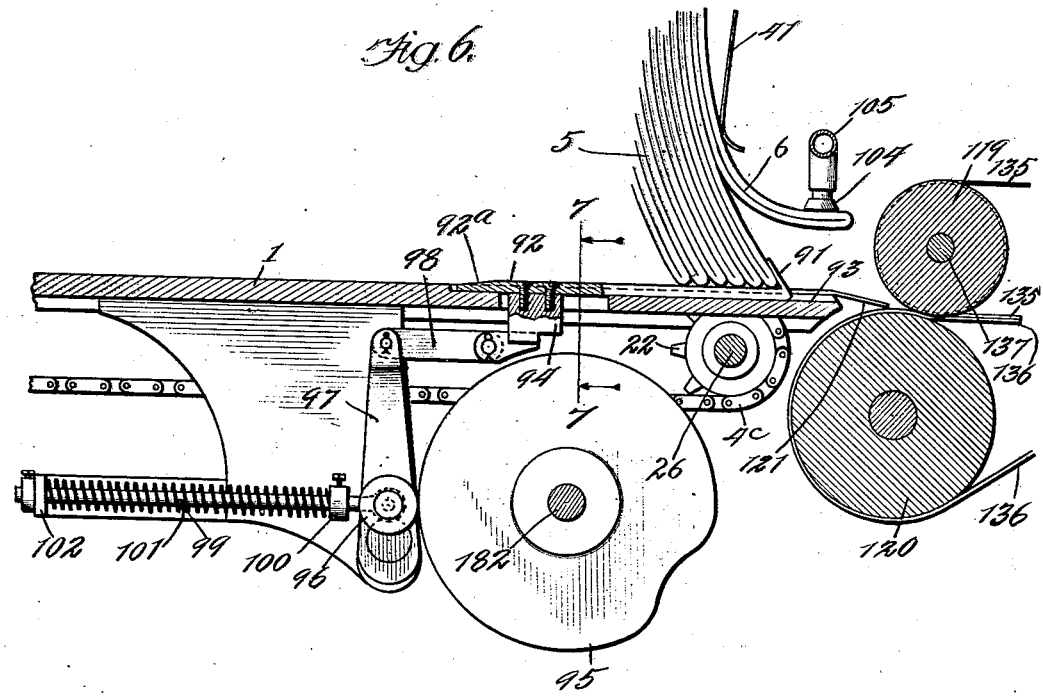

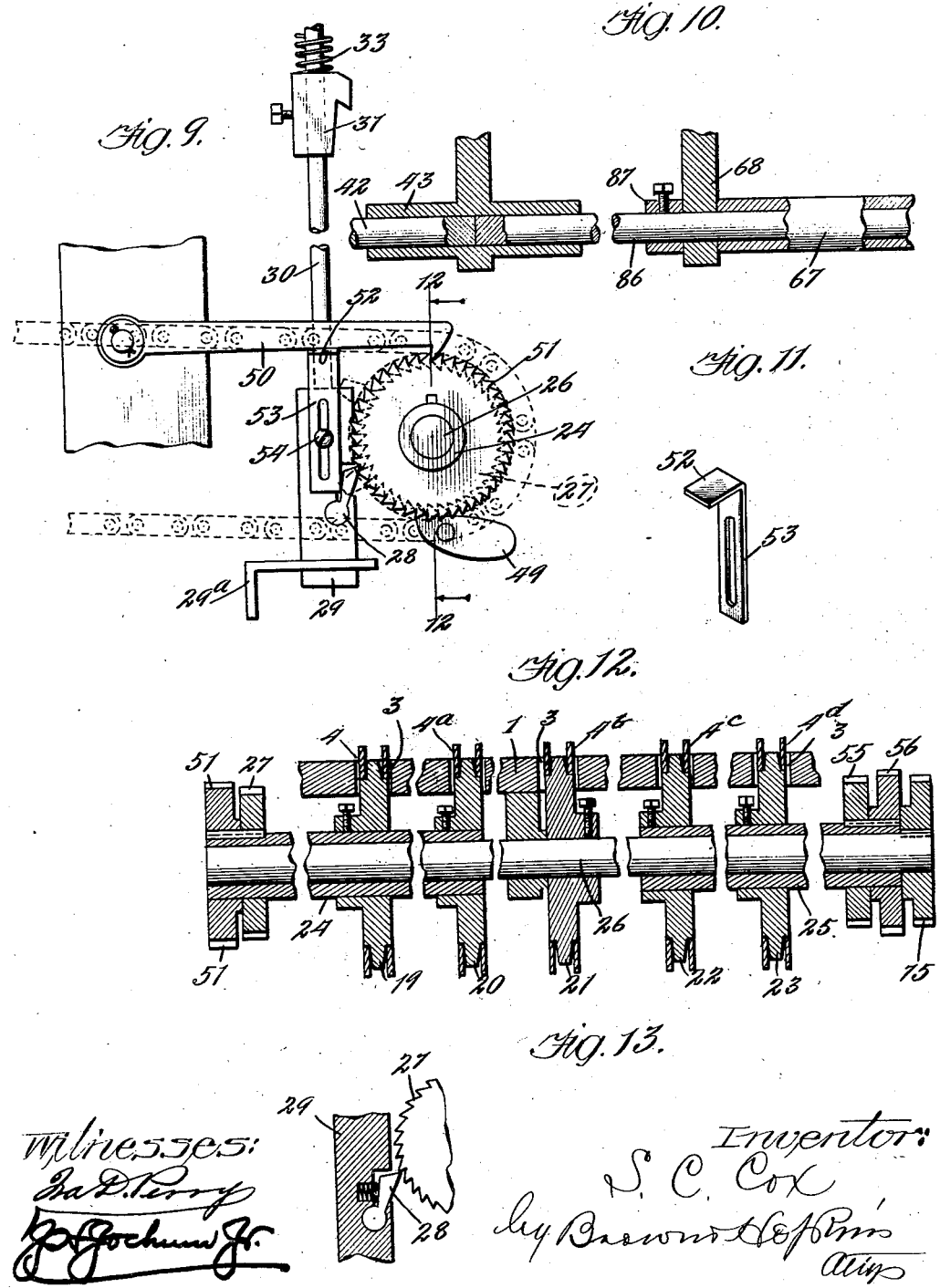

S. C. COX.
FEEDER FOR ADDRESSING MACHINES, &c.
APPLICATION FILED JUNE 25, 1907.
1,087,643.
Patented Feb. 17, 1914.
9 SHEETS—SHEET 9.
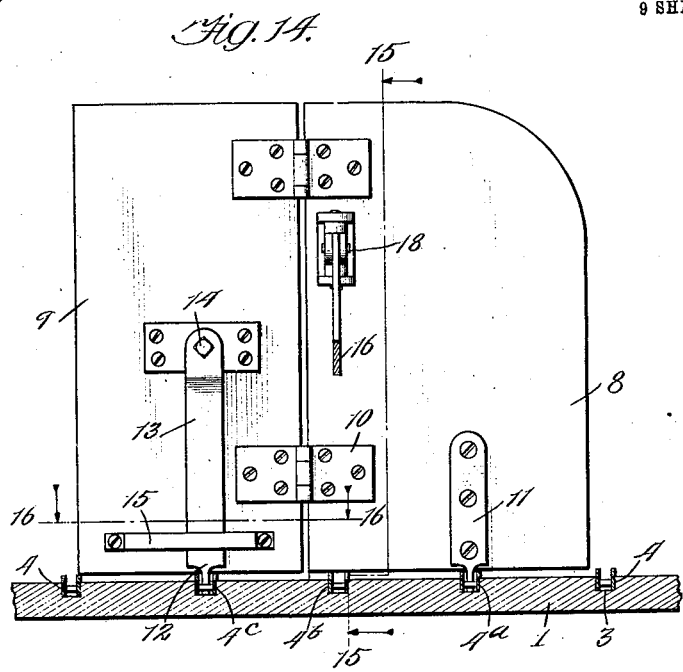
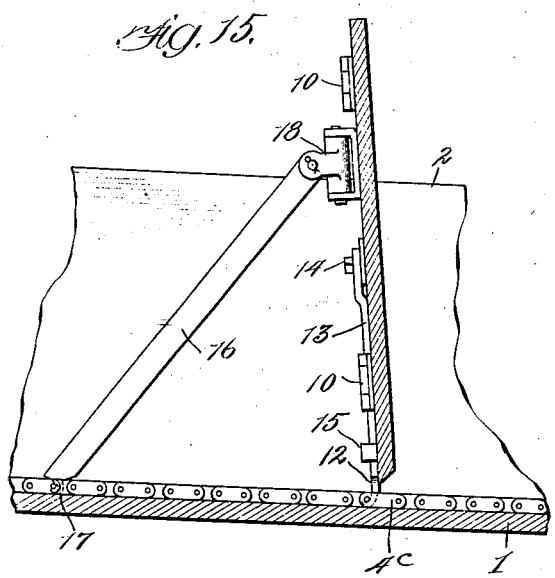
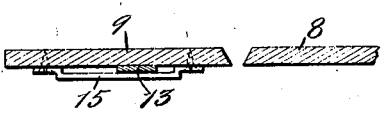
Witnesses:
Inventor:
S. C. Cox

UNITED STATES PATENT OFFICE.

SANDFORD C. COX, OF CHICAGO, ILLINOIS, ASSIGNOR TO COX MULTI-MAILER COMPANY, OF AUGUSTA, MAINE, AND NEW YORK, N. Y., A CORPORATION OF MAINE.

FEEDER FOR ADDRESSING-MACHINES, &c.

1,087,643.

Specification of Letters Patent. Patented Feb. 17, 1914.

Application filed June 25, 1907. Serial No. 380,722.

*To all whom it may concern:*

Be it known that I, SANDFORD C. COX, a citizen of the United States, residing at Chicago, in the county of Cook and State of Illinois, have invented certain new and useful Improvements in Feeders for Addressing-Machines, &c., of which the following is a full, clear, and exact specification.

My invention relates more particularly to devices for feeding newspapers, etc., to the addressing mechanism of newspaper addressing machines, but it is of course apparent that it may be utilized for feeding papers singly to any other mechanism designed to produce some operation which is individual to the papers.

The invention has particular reference to that form of feeding mechanism in which the papers to be fed are stored in a horizontal hopper on edge and are extracted therefrom one at a time and placed within the grasp of mechanism for conducting them away to the addressing mechanism or other mechanism designed to produce thereon some subsequent operation. In machines of this character the papers as they stand on edge in the hopper should be maintained in a certain definite relation to the devices which act upon the foremost paper of the supply for extracting it. It is found in machines of this character that as the supply moves forward in the hopper it exerts a tendency to recline, or in other words, the angle of inclination of the papers gradually grows greater or approaches more nearly the horizontal as the supply decreases.

The invention has for one of its objects therefore to avoid this objection, and to provide improved and efficient means for automatically acting upon the supply of papers to hold them at the proper degree of inclination as they move forward.

It is also understood that in feeding folded newspapers in a machine of this character considerable difficulty is experienced from the fact that the papers are thicker at one side than at the other and this makes the supply lack the necessary uniformity of compactness or density from end to end for perfect feeding, and causes the follower which supports the rear end of the supply to produce greater compression at one point than at another, thereby interfering with the proper operation of the feeding or extracting devices at the forward end of the pile.

The invention therefore has for its further object to provide an improved flexible form of follower device or mechanism for supporting the rear end of the supply without producing undue compression at any point.

A further object of the invention is to provide improved and efficient means for retaining the lower edges of the papers in position at the forward end of the supply while permitting a single paper to be extracted or lifted.

With a view to the attainment of these ends and the accomplishment of certain other objects which will hereinafter appear, the invention consists in the features of novelty which will now be described with reference to the accompanying drawings, and more particularly pointed out in the claims.

Figure 4:
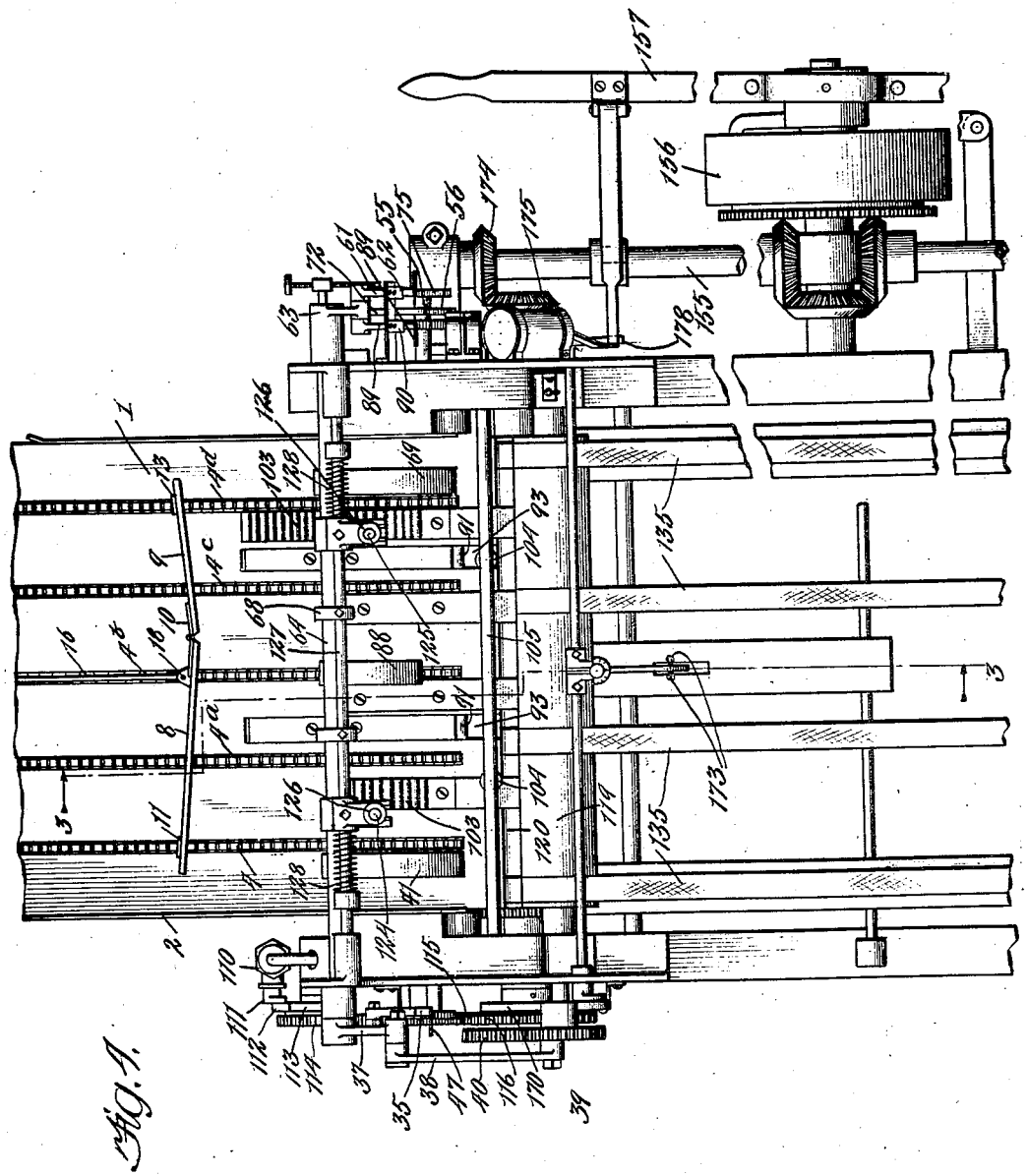

In the said drawings—Figure 1 is a side elevation of a part of the feeding mechanism of an addressing machine embodying this invention. Fig. 2 is an elevation looking at the opposite side. Fig. 2ª is a side elevation of the same side of the machine presented in Fig. 2, excepting that a portion of the outer automatic feed mechanism is cut away to disclose the inner automatic feed mechanism. Fig. 3 is a vertical longitudinal section taken on the line 3—3, Fig. 4. Fig. 4 is a plan view partly broken away. Fig. 5 is a vertical cross-section taken on the line 5—5, Fig. 3. Fig. 6 is an enlarged detail vertical longitudinal section taken on the line 6—6, Fig. 5. Fig. 7 is a detail cross-section on the line 7—7, Fig. 6. Fig. 8 is a detail perspective view of one of the detents hereinafter described. Fig. 9 is a detail side elevation of the ratchet mechanism for actuating the feed chains. Fig. 10 is an enlarged detail sectional view on the line 10—10, Fig. 5. Fig. 11 is a detail perspective view of an adjustable lug or lift hereinafter described forming part of the ratchet mechanism. Fig. 12 is a sectional view on the line 12—12, Fig. 9, the pawls being omitted. Fig. 13 is a detail sectional view of one of the pawls and a part of one of the ratchet wheels. Fig. 14 is a transverse sectional view of the bottom of the hopper and an elevation of the back of the follower-board. Fig. 15 is a vertical section thereof on line 15—15, Fig. 14. Fig. 16 is a detail horizontal section on line 16—16, Fig. 14. Fig. 17 is a detail perspective view of one of the follower board hooks. Fig. 18 is a detail view of a modification, showing an additional means for holding the paper and for protecting the gages.

The hopper in this exemplification of the invention is shown as consisting of a bottom portion 1 and a side board 2, and in which bottom are formed a number of longitudinal channels 3 for the reception and guidance of as many feed chains 4, in this instance five of such chains being shown, and which chains project sufficiently above the surface of the bottom to exert a feeding action against the lower edges of the papers as they rest on edge thereon. The general store or supply of the papers is indicated at 5 in Fig. 6, and at 6 is indicated one of the papers in the act of being lifted or extracted from the general supply. The follower-board before referred to is shown in this example of the invention as being composed of two sections 8, 9 hinged together on an upright axis by means of hinges 10. The lower edge of the section 8 is provided with a hook 11, which is adapted to be engaged between the links of one of the side chains at any point where the thickness of the supply of papers permits, and the board or section 9 is provided with a similar hook 12 which is formed on the lower end of a bar 13 pivoted at 14 to the back of section 9 and held against undue rearward movement by a strap 15. This strap, however, does not prevent the bar 13 from oscillating upon its pivot 14, and consequently even though the two chains in which the hooks 11, 12 are engaged may not be capable of moving toward and from each other, the sections 8, 9 of the follower-board, however, may go and come in a direction longitudinal of the chains in a sufficient degree to accommodate the particular angle of the rear end of the pile with respect to the longitudinal axis of the hopper, the link 13 undergoing a side motion behind its strap 15 to accommodate any increase in the distance between the hooks 11, 12 as one of the follower sections is moved forward with respect to the other. The follower is supported in its upright position at the proper angle of inclination by a brace-bar 16. The lower end of this bar is formed with a hook 17, which engages in the links of the center chain, while the upper end of the bar is pivoted to the back of the follower section 8 on both vertical and horizontal axes by means of a cordon cross 18, as well understood, so that the board 8 may be rotated on its vertical axis as before described without interfering with the brace 16, and may also be tilted or rotated on a horizontal axis to vary its inclination.

By this arrangement, it will be seen that the top and both sides of the board are given freedom of independent movement, so that either side or the top may be fed forward as required by the condition of the supply of papers. The means for thus feeding to the follower-board at both sides independently or at the top of the papers to straighten up the pile, will now be described.

As better shown in Fig. 4, the chains 4, 4ª, 4ᵇ, 4ᶜ and 4ᵈ extend to the forward end of the machine, where as shown in Fig. 12, they pass around sprocket wheels individual thereto, these being indicated at 19, 20, 21, 22 and 23, respectively. The two side sprockets on each side of the center sprocket are mounted upon and secured to two quill shafts or tubes 24, 25, respectively, while the center sprocket 21 is secured to an internal shaft 26. The two quill shafts being independent of each other, are provided with independent rotating mechanism, which are thrown out of action by the forward movement of the supply of papers at the sides respectively, so that if one side of the supply is behind it will be fed forward automatically without the opposite side being fed. The internal shaft 26 is also provided with independent rotating mechanism so that if the top of the pile should be behind this will be automatically straightened up without feeding the sides forward. The mechanisms for thus actuating the two quill shafts 24, 25 are practically duplicates of each other arranged one at each side of the machine, and hence the detailed description of one will suffice for both. As better indicated in Fig. 12, the end of the shaft 24 is provided with a ratchet wheel 27, and arranged to engage this is a suitable pawl 28, mounted in a block 29 on the lower end of a reciprocating rod 30, the lower end of the block being held to its vertical motion by any suitable guide 29ª. Upon this rod 30 is adjustably secured a lug 31, between which and a guide 32 for the rod bears a spring 33, which returns the rod to its lowered position when released. Arranged in position to engage with the lug 31 is a hook 34 formed on a rod 35, which is pivoted at 36 to a crank arm 37. This crank arm receives oscillatory motion from a pitman 38 connected by a crank 39 to a crank wheel 40, and at each revolution of the crank 39 the hook 34 engages the lug 31, and by lifting rod 30 causes the pawl 28 to engage and rotate the ratchet 27 and thereby impart feeding motion to both of the chains 4, 4ª on the hollow shaft 24 and consequently feed the supply forward on this side not only by the friction of the chains against the lower edges of the papers, but by positively pulling forward the follower-board section 8. When this side of the pile is fed forward a sufficient distance, however, the feeding mechanism is automatically thrown out of action. It will be seen that the feeding mechanism just described will operate only when the hook 34 is in line with the lug 31. When the papers arrive at the proper position this hook is thrown out of line with the lug and remains out of line until this side of the supply again falls behind. In order to accomplish this at this side of the supply, as better shown in Fig. 5, is arranged a gage 41, which hangs down in front of the papers and is adapted to be engaged by them or by the foremost paper, preferably at a point near their lower edges. This gage is mounted upon a rock shaft 42 extending transversely of the machine, and having one end supported in a suspended bearing 43 and its outer end supported in a side frame 44. The outer end is provided with a depending arm 45 outside the frame 44, and this arm carries an adjustable trip which is adapted to engage the arm 35 and hold its hook 34 out of line with the lug 31 when the side of the supply of papers toward the gage 41 is forward a sufficient distance to accomplish that result, the side of the arm 35 being provided with a thin projection or plate 47 to insure engagement with the trip 46, and in order that the arm 35 may not be subjected to undue oscillation or erratic movement, a small spring 48 is arranged in position to bear against it, as shown in Fig. 1, and press it back to position when released by the trip 46.

In order to prevent any possible retrograde movement of the chains 4, 4ª, a check pawl 49 is arranged to engage the ratchet wheel 27, and in order to prevent any false feeding movement of the chains 4, 4ª through any cause whatever, a check pawl 50 is arranged to engage a special ratchet wheel 51 secured to the outer end of shaft 24 with its teeth turned in the opposite direction to the teeth of ratchet 27. This check pawl 50 is automatically disengaged just prior to the engagement of pawl 28 with ratchet 27, by a trip 52, having a slotted shank 53 adjustably secured to the side of block 29 by a screw 54.

As before stated, the automatic feeding mechanism on the opposite side of the machine for rotating the quill shaft 25 is practically a duplicate of that which has just been described and which need not be again referred to in detail, suffice it to say that 55 is the ratchet wheel corresponding to ratchet 27, 56 is the ratchet wheel corresponding to ratchet 51, and by reference to Fig. 2 of the drawing all of the parts of the feeding mechanism already described will be shown duplicated at that side of the machine; 57 being the pawl block corresponding to pawl block 29; 58 being the rod carrying the same and having lug 59 corresponding to lug 31; 60 being the same as hook 34; 61 the counterpart of arm 35; and 62 the spring that holds arm 61 in position. On this side of the machine, however, the upper end of arm 61 is pivoted to a crank 63, and that crank as well as the crank 37, is rigidly secured to a shaft 64 journaled in side frame 44 at one side and side frame 65 at the other side, so that the one rod 38 rocks both cranks 37, 63. 66 is the depending arm corresponding to the arm 45, and 67 is a shaft for this arm 66 corresponding to the shaft 42. The inner end of the shaft 67 is supported by a hanger 68, (see Figs. 5 and 10,) while the outer end is journaled in the side frame 65. The shaft 67, as better shown in Fig. 10, is a hollow shaft, and to it is secured a depending gage 69, as shown in Fig. 5, which corresponds in function to the gage 41, and engages the supply of papers on this side of the machine at a point near their lower edges in the same manner as the gage 41 acts on the opposite side, so that when gage 69 is pushed forward to a predetermined extent by the forward motion of the papers at their lower edges, the trip of arm 66, which is shown at 70, engages arm 61 and holds its hook 60 out of line with the lug 59. On this side of the machine 72 is the check pawl that corresponds with check pawl 50, and 73 is the trip which lifts the pawl 72 out of engagement with its ratchet 56, while 74 is the check pawl corresponding to check pawl 49. On one end of the internal shaft 26 is secured a ratchet wheel 75, (see Fig. 12,) which in conjunction with an operating mechanism similar to that for operating the ratchets 27 and 55, serves to rotate the sprocket 21 and cause the proper amount of feeding movement of the middle chain 4ᵇ, which pushes the top of the follower-board up to the proper degree of inclination. This actuating mechanism for the ratchet 75 is in all substantial particulars a counterpart of the mechanism which actuates the ratchet 55, and when the machine is viewed as in Fig. 2, it may be regarded as disposed directly in front of the corresponding elements of the mechanism for ratchet 55. In Fig. 2ª this actuating mechanism for the ratchet wheel 55, which is arranged on the outside, is removed or cut away to disclose the actuating mechanism for the ratchet 75, but in Fig. 2 both mechanisms may be regarded as present, the elements of one being regarded as disposed directly behind those of the other for the sake of simplicity and avoiding confusion in the drawing, but in practice nevertheless it will be understood that the elements of the two mechanisms being independent, there will be times when they will not be so relatively situated. Referring now more particularly to Fig. 2ª of the drawing, it will be seen that to the crank arm 63 is also secured a depending arm 76, which is a counterpart of the depending arm 61. The crank arm 63 on this side of the machine, as better shown in the plan view in Fig. 4, serves for supporting and operating both of the arms 61 and 76 simultaneously, and as the arm 63 is oscillated by its shaft 64 therefore the hook 77 on the lower end of arm 76 is caused to engage with a lug 78, corresponding in function and construction to the lug 59. The lug 78 is arranged on a vertical rod 79, which is normally returned to its lowered position by means of a spring 80, acting in the same manner between lug 78 and a guide 81 as the spring 33 before described. The lower end of the rod 79 carries a pawl block 82, in which is pivoted a pawl 83 arranged to engage the ratchet 75 when the hook 77 engages and lifts the lug 78, thereby rotating the internal shaft 26 and feeding the center chain 4$^b$. Should the top of the pile or supply of papers be sufficiently forward, however, the hook 77 will be held out of line with the lug 78, by an adjustable trip 84, corresponding in construction, arrangement and function to the adjustable trip 70, and which trip 84 is secured in the lower end of a depending arm 85 secured at its upper end to the outer end of an internal shaft 86, which is journaled in the hollow shaft 67 at its outer end and at its inner end in the bearing 43, the shaft 86 being held against outward displacement by a collar 87, (see Fig. 10.) Secured on the inner end of the shaft 86 is a gage 88, (see Fig. 5) which extends downwardly a sufficient distance to be engaged by the upper edge of the supply of papers as they move forward, thereby rocking the shaft 86 and causing the arm 85 to project its trip 84 forward against the arm 76, or more accurately speaking, against a plate 89, provided on such arm for the purpose.

90 is a spring like the spring 62 for the purpose of holding the arm 76 in line with the lug 78 excepting when forced out of line by the trip 84.

As the papers are pushed forward by the feed chains and follower-board their lower edges are stopped or detained by one or more detents 91, (see Fig. 6). Each of these is formed upon a horizontal shank 92 seated in a suitable guide slot 93 in the bottom of the hopper and secured at their rear ends to a cross-head 94 in such a manner that when the cross-head is moved back and forth the detents 91 will be reciprocated toward and from the lower edges of the papers, being carried away from the papers to allow the foremost paper to be lifted at its lower edge, as shown at 6 in Fig. 6, preparatory to being introduced between the feed or extracting rolls, and being carried toward the papers for the purpose of retaining the main supply in its proper position with respect to the feed gages 41, 69 and 88 before described. These detents 91 are provided with a rear beveled end 92$^a$ and are given this reciprocating movement at the proper time by means of a cam 95, which is arranged to engage anti-friction roller 96 or other suitable bearing on a pivoted arm 97 whose upper end is connected by a link 98 with the cross-head 94, the arm 97 being impelled toward the cam 95 by spring 99 bearing against collar 100 on rod 101 having its end supported by a suitable guide boss 102, so that as the cam presents its minor diameter to the anti-friction roller 96 the spring 99 will impel the detents 91 forward, and as the major diameter of the cam comes around they will be withdrawn toward the papers against the action of the spring. This back and forth movement of the detents moreover performs the further function of jogging the lower edges of the pile or supply at its forward end to keep the supply at that point from crawling which will maintain it in better feeding condition. In order that the papers may not slip forward too readily as the detents 91 make their forward movement, a number of corrugated plates serving as retainers 103 are arranged on the bottom of the hopper beside the detents.

Just before the detents 91 move forward the foremost paper is engaged by one or more suckers 104 depending from a manifold sucker pipe or bar 105, which is journaled in a bracket 106 on one side of the machine, and a bracket 107 on the other side. As better shown in Fig. 5, this sucker bar or tube 105 is offset or cranked at its ends so that when rotated on its journals at the ends its intermediate or offset portion will strike an arc toward and from the papers and thereby cause the suckers 104 to move from the position shown in Fig. 6 inwardly against the foremost paper of the supply. One end of the manifold tube or sucker bar 105 is, of course, closed, while the other end is connected by a tube 108 and pipe 109 to any suitable exhausting mechanism for maintaining a vacuum or partial vacuum in the sucker bar, the end of the tube 108 having any suitable connection with the end of the sucker bar which will permit the latter to rotate while maintaining an air-tight joint. When the suckers 104 thus engage the foremost paper the tube 108 is placed in communication with the main vacuum pipe 109 by the automatic opening of a cock 110, (see Fig. 1,) and after the suckers 104 lift the lower edge of the paper to the position shown in Fig. 6, the detents 91 being then returned to retain the main supply in position, the cock 110 is automatically closed, thereby relieving the suction in the suckers 104 and allowing the elevated edge of the paper 6 to fall on the outer sides of the detents 91. This automatic opening and closing of the vacuum cock 110 may be produced in any suitable way. In the example shown, the cock is provided with an arm or lever 111 having a lug 112, which is arranged to be engaged by a cam 113 of suitable form carried on the back of a gear wheel 114, which receives motion from an idler 115 engaging with a gear wheel 116 just behind gear wheel 40, and to which the gear wheel 40 is secured. The gear wheel 116 being secured to the gear wheel 40 adjustably by means of bolts 117 and slots 118, so that the crank 39 may be independently adjusted with respect to the balance of the mechanism, as described in a former application, and the various gears of the train thus described being also arranged to be driven in proper time with the feed rollers 119, 120, as described in said former application. When the paper is thus dropped by the sucker 104 its lower edge rests upon or adjacent to the upper surface of one or more guide dogs 121 arranged on the bottom of the hopper contiguous to the feed rolls 119, 120 and projecting partially over the larger feed roll 120, as shown in Fig. 6, and as it does so it is impelled in a downward and forward direction by one or more needle blocks 122, 123 carried by the lower ends of two arms 124, 125, respectively, reciprocally mounted in guide sleeves 126, which are pivoted on a cross rod 127 supported in the side frames 44, 65. These guide sleeves 126 are acted upon by springs 128 to cause the blocks 122, 123 to press toward the papers; and the arms 124, 125 are given a reciprocal motion in their guides 126, to cause the needle blocks to engage the released paper and push it downward, by the rocker shaft 64, which is provided with crank arms 129, 130 having links 131, 132, respectively pivoted to collars 133, 134, secured in any suitable way to the arms 124, 125.

The feed rollers 119, 120 may be provided with tapes 135, 136, respectively, for conducting away the paper which has been placed between them. The upper feed roll 119 is movable bodily with respect to its companion roll 120, so as to rise and fall with the varying thicknesses of the folded papers while keeping up the requisite pressure for producing the feeding movement, and to this end the shaft 137 of feed roll 119 is journaled in pivoted arms 138, 139.

A power shaft 155 is provided, which derives its motion from a clutch 156, capable of being released by a lever 157. When the latter is moved in one direction the outer face of the clutch 156 may be utilized, if desired, as a driving pulley. The shaft 155 serves by means of beveled gears 174, 175 to drive the shaft of the lower roller 120 as has been explained in said former application, and upon the shaft of the roller 120 is arranged a cam 176, which engages an anti-friction roller 177 on a pivoted lever 178, whose lower end is attached to a spring 179 serving to hold the anti-friction roller against the cam, while the upper end of this lever is pivoted to a horizontal rack-bar 180, engaging with a pinion 181 on the journal of a sucker bar 105 and thereby serving to rock said sucker bar in the manner before described at the proper time at each revolution of the shaft 155. The cam 95 which actuates the detents 91 may be driven also from the shaft 155 through any suitable connections. In this example of the invention, this cam is mounted upon a shaft 182, on one end of which the gear wheel 114 is secured.

In the modification shown in Fig. 18 a flexible member 182$^a$, such as a spring or the like, is secured to each of the brackets 106 and 107, and are preferably arranged to engage the foremost paper at points intermediate the ends of the gages 41 and 69 to hold the paper and prevent its body portion from being raised too high to prevent a false feeding movement of the paper, but will at the same time protect the gages and not interfere with the elevation of the extremity of the foremost paper by the suckers 104 to clear the detents 91. Furthermore, these members 182$^a$ serve as an additional means to direct the papers between the rollers 119, 120.

In order that the invention might be understood by those skilled in the art, an exemplification thereof has been thus specifically described, but

What I claim as new and desire to secure by Letters Patent, is:

1. In a machine for the purpose described, the combination of means for holding a supply of papers to be fed, independent feeding means for urging the supply forward at the bottom and top, and positive means for actuating said top and bottom feeding means independently.

2. In a machine for the purpose described, the combination of means for holding a supply of papers to be fed, independent feeding means for urging the supply forward at both sides and the top, and means for automatically actuating the side feeding means independently of each other, and means for actuating the top feeding means independently of the side feeding means.

3. In a machine for the purpose described, the combination of means for holding a supply of papers to be fed, a follower for supporting the rear end of the supply, feeding means for urging the follower forward at the top independently with respect to the bottom thereof and against the supply, and means for automatically actuating said follower urging means as the feeding action is required.

4. In a machine for the purpose described, the combination of means for holding a supply of papers to be fed, a follower for supporting the rear end of the supply, said follower being movable into various planes of inclination, means for changing the inclination of the follower automatically by urging it forward at one point faster than at another, and means for automatically throwing said urging means out of action by the forward movement of the supply of papers.

5. In a machine for the purpose described, the combination of means for holding a supply of papers to be fed, a follower for supporting the rear end of the supply, means for moving the follower forward bodily with the supply, means independent of the last said means for moving the top of the follower forward independently of its bottom part, and means for throwing the latter said means out of action by the forward movement of the supply of papers.

6. In a machine for the purpose described, the combination of means for holding a supply of papers, a follower for supporting the rear end of the supply, means engaging the sides of the follower for urging the sides forward independently of each other, means operatively related to the top of the follower for urging the top forward independently of the bottom, and means for throwing the top-urging means out of action by the forward movement of the supply.

7. In a machine for the purpose described, the combination of means for holding a supply of papers to be fed, a follower for supporting the rear end of the supply composed of two sections hinged together on an upright axis, means for feeding each section of the follower forward at the bottom independently, and means for throwing said follower-feeding means out of action by the forward movement of the papers.

8. In a machine for the purpose described, the combination of means for holding a supply of papers to be fed, a follower for supporting the rear end of the supply composed of two hinged sections, means for feeding said sections forward at the bottom independently, means for feeding the follower forward at the top independently of the bottom, and means for throwing the said top follower supply-feeding means out of action by the forward movement of the papers.

9. In a machine for the purpose described, the combination of means for holding a supply of papers to be fed, means for feeding the sides of the supply forward independently of each other, means for feeding the top of the supply forward independently of the sides, gages arranged to be engaged by the forward end of the supply at the sides and top independently, and means operatively connecting each of said gages with the side and top feeding means respectively for throwing the feeding means out of action by the forward movement of the supply.

10. In a machine for the purpose described, the combination of means for holding a supply of papers to be fed, means for feeding the supply forward at the sides independently and at the top independently of the sides, embodying traveling chain belts, sprocket wheels for moving said belts respectively, a shaft for the sprocket wheel which moves the top feeding means, hollow shafts encompassing the first said shaft and being secured to the sprocket wheels which move the side feeding means, ratchets for rotating said shafts respectively, means for rotating said ratchets respectively comprising disengageable members, and gages disposed at the forward end of the supply at the top and sides respectively operatively connected respectively with the said disengageable members which operate said ratchets, for throwing said disengageable members of each ratchet out of engagement.

11. In a machine for the purpose described, the combination of means for feeding the supply of papers forward, embodying a ratchet mechanism, a pawl for locking the ratchet mechanism against forward or feeding movement, and a trip operatively connected with the ratchet mechanism for disengaging said pawl automatically preparatory to making movement in a feeding direction.

12. In a machine for the purpose described, the combination of means for feeding the supply of papers forward, embodying a ratchet wheel, a pawl for engaging and rotating said wheel, and means for actuating said pawl, a latching pawl for holding the ratchet wheel against forward movement, and a trip moving with the first said pawl for disengaging said latching pawl preparatory to the engagement of the first said pawl.

13. In a machine for the purpose described, the combination of means for holding a supply of papers to be fed, means for feeding the supply forward at the sides independently and at the top independently of the sides, a gage arranged to be engaged by the forward end of the supply at the top, a shaft on which said gage is mounted, a hollow shaft in which said first shaft is situated, a gage secured to said hollow shaft and arranged to be engaged by the forward end of the supply at the side, means for operating said side and top feeding means independently, comprising for each two disengageable members, trips connected with said shaft and hollow shaft respectively for disengaging said disengageable members respectively when the said gages are moved by the forward movement of the supply of papers, a gage for the other side of the supply, means for operating the feeding means at that side of the supply, and means operatively connecting the last said gage with the last said means for throwing it out of action as the papers move forward.

14. In a machine for the purpose described, the combination of means for holding a supply of papers to be fed, on edge, feeding means for a supply of papers, a detent for engaging the forward end of the supply at the bottom and to extend under the papers, means for reciprocating said detent longitudinally with relation to the direction of feeding movement of the supply of papers, and means for lifting the foremost paper and placing it in advance of the detent.

15. In a machine for the purpose described, the combination of means for holding a supply of papers to be fed, on edge, an upwardly extending detent arranged to engage the forward end of the supply at the bottom, said detent also extending under the papers, means for imparting a reciprocating motion to said detent in a direction lengthwise of the supply of papers, means for engaging the foremost paper and lifting it above the detent, as the detent moves forward and dropping it in front of the detent when the detent returns, and means for urging the paper thus displaced forwardly from the balance of the supply.

16. In a machine for the purpose described, the combination of means for holding a supply of papers on edge, a detent extending under the papers and arranged to engage the forward end of the supply at the bottom, means for reciprocating said detent bodily as contradistinguished from rotating it about a center, whereby it will produce a jogging action on the lower edges of the papers, and means for lifting the foremost paper and placing it in advance of the detent.

17. In a machine for the purpose described, the combination of means for holding a supply of papers on edge, a detent arranged to engage the forward end of the supply at the bottom, a reciprocating shank carrying said detent and extending rearwardly under the papers, means for reciprocating said shank and detent, and means for lifting the foremost paper and placing it in advance of the detent.

18. In a machine for the purpose described, the combination of means for holding a supply of papers on edge, a reciprocating detent arranged to engage the forward end of the supply at the bottom, a guide tongue arranged along the line of movement of the detent and at the side thereof for guiding the paper after it is lifted over the detent, means for thus lifting the paper to a position in front of the detent, means for receiving the paper from said guide, and means for pushing the paper along the guide to said receiving means.

19. In a machine for the purpose described, the combination of means for holding a supply of papers on edge, a detent for engaging the forward end of the supply at the bottom, a shank to which the detent is secured extending rearwardly under the supply of papers and having a rear beveled end arranged to engage the papers, means for reciprocating said shank and detent and thereby jogging the papers, and means for extracting the foremost paper from engagement by the detent.

20. In a machine for the purpose described, the combination of means for holding a supply of papers on edge, a reciprocating detent arranged to engage the forward end of the supply at the bottom, a corrugated member upon which the lower edges of the papers rest contiguous to said detent, means for reciprocating the detent to jog the papers, and means for extracting the foremost paper from the supply as the detent releases its engagement therewith.

21. In a machine for the purpose described, the combination of means for holding a supply of papers to be fed, means for feeding the supply forward, a gage arranged to be engaged by the forward end of the supply, means operatively connecting said gage with the feeding means for throwing the feeding means out of action by the forward movement of the supply, means for lifting the edge of the foremost paper and means for protecting the gage from movement due to the action of the said lifting means.

22. In a machine for the purpose described, the combination of means for holding a supply of papers to be fed, a follower for supporting the rear end of the supply, means independent of the last said means for moving the top of the follower forward independently of the bottom part, a gage arranged to be engaged by the forward end of the supply, means operatively connecting said gage with the feeding means for throwing the feeding means out of action by the forward movement of the supply, means for lifting the edge of the foremost paper, and means for protecting the gage from movement due to the action of the said lifting means.

23. In a machine for the purpose described, the combination of means for holding a supply of papers to be fed, means for feeding the supply forward, a gage arranged to be engaged by the forward end of the supply, means operatively connecting said gage with the feeding means for throwing the feeding means out of action by the forward movement of the supply, means for lifting the edge of the foremost paper, and a yielding member adapted to be engaged by the foremost paper for protecting the gage from movement due to the action of said lifting means.

In testimony whereof I have signed my name to this specification, in the presence of two subscribing witnesses, on this 16th day of May, A. D. 1907.

SANDFORD C. COX.

Witnesses:
JOHN HUNEKE,
J. TOMLINSON.